United States Patent [19]
White et al.

[11] Patent Number: 6,145,880
[45] Date of Patent: Nov. 14, 2000

[54] KNEE BOLSTER ASSEMBLY

[75] Inventors: James Patrick White, Macomb; James Jenying Wang, Troy, both of Mich.

[73] Assignee: General Motors Corporation, Detroit, Mich.

[21] Appl. No.: 08/994,511

[22] Filed: Dec. 19, 1997

[51] Int. Cl.$^7$ ............................................. B60R 21/045
[52] U.S. Cl. ....................................................... 280/752
[58] Field of Search ................................. 280/748, 750, 280/751, 752

[56] References Cited

U.S. PATENT DOCUMENTS

| | | |
|---|---|---|
| 3,850,447 | 11/1974 | Nagazumi et al. ................. 280/752 |
| 3,856,103 | 12/1974 | Scholz et al. ....................... 180/90 |
| 3,924,707 | 12/1975 | Renner et al. . |
| 3,930,665 | 1/1976 | Ikawa . |
| 3,938,821 | 2/1976 | Haas et al. . |
| 4,032,175 | 6/1977 | Aibe et al. ......................... 280/751 |
| 4,320,909 | 3/1982 | Nakamori et al. . |
| 4,349,214 | 9/1982 | Inasawa et al. . |
| 4,434,999 | 3/1984 | Sato ................................... 280/752 |
| 4,949,990 | 8/1990 | Hirahara et al. . |
| 4,978,136 | 12/1990 | Tomita et al. . |
| 5,037,130 | 8/1991 | Ikuyama . |
| 5,096,223 | 3/1992 | Tekelly et al. . |
| 5,201,544 | 4/1993 | Matano et al. . |
| 5,238,286 | 8/1993 | Tanaka et al. . |
| 5,273,314 | 12/1993 | Sakakibara . |
| 5,370,417 | 12/1994 | Kelman et al. . |
| 5,413,379 | 5/1995 | Koma . |
| 5,456,494 | 10/1995 | Witkovsky . |
| 5,476,283 | 12/1995 | Elton . |
| 5,482,319 | 1/1996 | Yoshimura et al. . |
| 5,577,770 | 11/1996 | Sinner et al. . |
| 5,584,509 | 12/1996 | Tekelly et al. . |

FOREIGN PATENT DOCUMENTS 2-225154  9/1990  Japan ..................................... 280/752

Primary Examiner—Paul N. Dickson
Attorney, Agent, or Firm—Charles E. Leahy; Kathryn A. Marra

[57] ABSTRACT

A knee bolster assembly is provided for use in a vehicle having a vehicle driver and including a steering column. The knee bolster assembly includes a central bracket adapted for partially surrounding the steering column and a foam element mounted on the central bracket. The knee bolster further includes left and right knee brackets mounted on opposite sides of the central bracket. The knee brackets each have a generally D-shaped cross-section including a convex rear wall positionable adjacent a vehicle driver such that upon loading by the vehicle driver, the knee brackets deform about multiple, nonspecific bend lines for absorption of energy. The knee brackets preferably include inner and forward walls rigidly secured to the central bracket and outer and rear walls that significantly deform for absorption of energy.

6 Claims, 4 Drawing Sheets

KNEE BOLSTER ASSEMBLY

TECHNICAL FIELD

This invention relates to a knee bolster assembly for use in a motor vehicle, especially for protection of a vehicle driver.

BACKGROUND OF THE INVENTION

It is known in the prior art to provide a vehicle interior with a knee bolster assembly that straddles the steering column at a location below the steering wheel and generally on a lower portion of the instrument panel. The knee bolster is designed to absorb the impact of the occupant's knees during a forward collision as a means of supplementing seat belts and other occupant restraints.

One such prior art knee assembly is shown in FIGS. 1 and 2. During a frontal vehicle collision, the driver's knees 1 contact an outer knee bolster trim panel 2. The trim panel 2 transfers the load to a relatively heavy metal outer knee bolster 5, which constitutes a significant percentage of the weight of the knee bolster assembly 7. The knee bolster assembly 7 includes an integrally formed energy absorbing main bracket 8 constructed from sheet metal. The main bracket 8 includes two side bracket portions 3 being open facing the driver and integrally incorporated with a central bracket portion 4. The outer knee bolster 5 is positioned between the trim panel 2 and the brackets 3 for covering the bracket 8. The assembly 7 is mounted to a rigid steering column bracket 6. As shown in FIG. 2, the knees 1 load the outer knee bolster 5 which transfers load to the central bracket portion 4 and the side bracket portions 3 which buckle about a single predetermined bend line for absorbing energy.

SUMMARY OF THE INVENTION

The present invention provides alternatives and advantages over the prior art by providing a knee bolster assembly including brackets that bend about a multiple number of bend lines which are not predetermined. The structure of the knee bolster assembly enables response to lateral loading as well as frontal loading directions. Furthermore, it is an object of the invention to provide a knee bolster assembly that bends about a multiple number of nonspecific bend lines for a steady compression loading and for increasing energy absorption for a given deflection. It is a further object of this invention to provide a knee bolster assembly that begins deforming immediately upon contact at a low load level and continues to deform and absorb energy at a relatively steady pace. It is another object of this invention to provide a knee bolster assembly which is simple in construction and lightweight as compared to the prior art by the elimination of the outer knee bolster.

According to the invention, a knee bolster assembly is provided for use in a vehicle having a vehicle driver and with the vehicle including a steering column and a steering column bracket. The knee bolster assembly includes a central bracket adapted for partially surrounding the steering column and a foam element mounted on the central bracket. The knee bolster further includes left and right knee brackets mounted on opposite sides of the central bracket. The knee brackets each have a generally D-shaped cross-section including a convex rear wall positionable adjacent a vehicle driver such that upon loading by the vehicle driver, the knee brackets deform about multiple, nonspecific bend lines for absorption of energy. The central bracket is adapted for attachment to the steering column bracket.

Preferably, the vehicle includes a knee bolster trim panel and the foam element is positioned directly forward of the knee bolster trim panel for elimination of the outer knee bolster assembly as enabled by the structure of the knee brackets and central bracket. The central bracket preferably includes a rearward foam-receiving wall and the foam element is mounted on the foam-receiving wall. The foam-receiving wall and foam element are shaped, preferably convex, for directing frontal loads from the vehicle driver in laterally outboard directions towards the respective knee brackets.

According to other preferred aspects of the invention, the knee brackets each include inner walls and forward walls attached to the central bracket and the knee brackets include outer walls and rearward walls being free from the central bracket. The outer and rearward walls significantly deform during loading for absorption of energy and the inner walls and forward walls deform significantly less than the outer and rearward walls and provide stability to the knee brackets, especially in the lateral direction. Advantageously, the inner walls and forward walls are securely connected to the central bracket for minimizing deformation during loading and the rear walls and the outer walls steadily deform about multiple bend lines during loading for energy absorption. Preferably, the D-shaped bracket has overlapping portions cooperatively forming the forward walls and cooperatively closing the D-shaped cross section. In addition, the knee brackets are preferably formed separate and independent from the central bracket.

According to other preferred aspects of the invention, a knee bolster assembly includes a central bracket adapted for partially surrounding the steering column and for attachment to the steering column bracket. The central bracket includes a rear foam-receiving wall and left and right side walls extending forward from the foam-receiving wall. The central bracket also includes outward laterally bent ends extending from forward ends of the respective side walls. A foam element is mounted on the foam-receiving wall of the central bracket. Left and right knee brackets are mounted to the central bracket. The knee brackets each have a generally D-shaped cross-section and include a convex rear wall positionable adjacent a vehicle driver. The knee brackets each include an inner wall attached to the respective side walls of the central bracket and each include a forward wall attached to the respective bent ends of the central bracket. The central bracket is significantly stiffer than the knee brackets such that upon loading by the vehicle driver, the knee brackets deform about multiple, nonspecific bend lines for absorption of energy and such that the outer walls and the rear walls of the knee brackets deform significantly more than the inner walls and forward walls.

BRIEF DESCRIPTION OF THE DRAWINGS

The present invention will now be described, by way of example, with reference to the accompanying drawings in which.

DESCRIPTION OF THE PREFERRED EMBODIMENT

Figure 6:
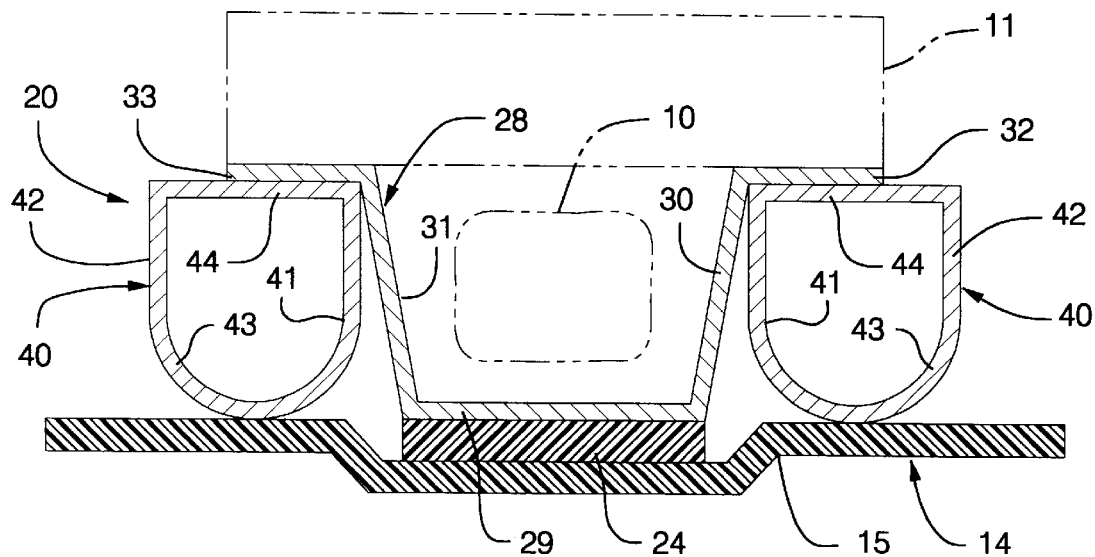
FIG. 6 shows a cross-sectional view of a schematic of the knee bolster assembly according to the present invention with the steering column and steering column bracket shown in phantom lines and with the knee bolster assembly in an undeformed condition.
Figure 7:
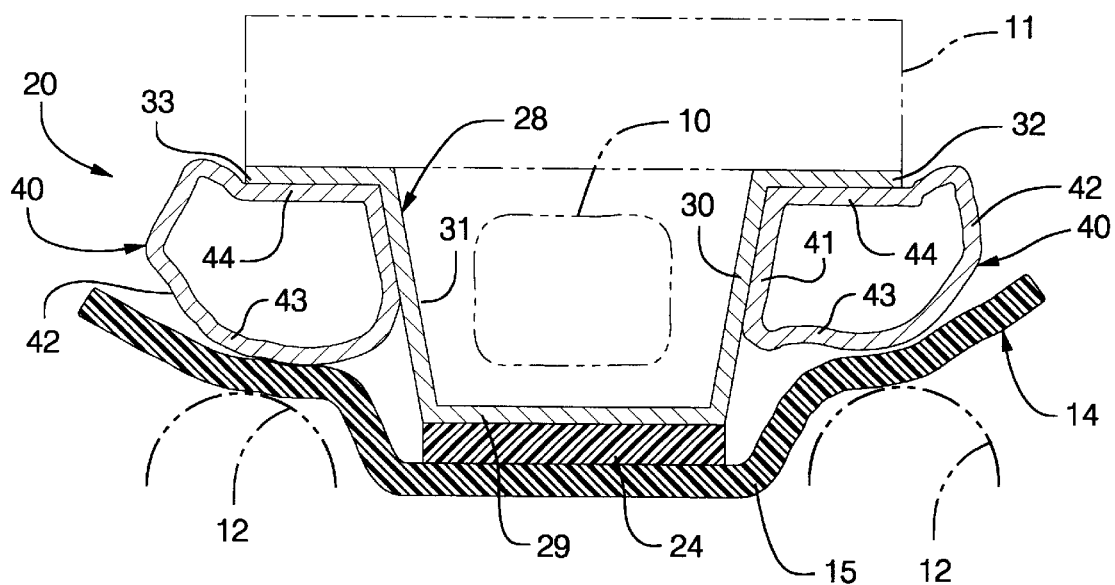
FIG. 7 shows the schematic cross-sectional view of FIG. 6, but with the knee bolster assembly in the deformed condition.

Referring to FIGS. 6 and 7, it is well known in the prior art to provide a vehicle having an interior including an instrument panel 14 positioned in front of the vehicle occupants. The instrument panel 14 includes an outer knee bolster trim panel 15 located on a lower portion of the instrument panel 14. The trim panel 15 may be of any suitable construction, and is commonly made of a plastic substrate covered by foam and skin (not shown). Typically, the vehicle driver is positioned rearward of a steering column 10 that supports a steering wheel (not shown). As best shown in FIG. 7, the driver's knees 12 are typically straddled on either side of the steering column 10. The steering column 10 is attached to a rigid steering column bracket 11 or the instrument panel 14 may include other underlying rigid vehicle structure onto which a knee bolster assembly 20 may be mounted for supplemental protection of the lower extremities of the vehicle driver.

The knee bolster assembly 20 includes the component parts of left and right energy absorbing knee brackets 40, a central foam element 24, and a central bracket 28. The left and right energy absorbing knee brackets 40 are each constructed as individual components and preferably are made of an aluminum alloy AA5083, which preferably has a thickness of 1.5 mm. The knee brackets 40 are preferably each cut and formed by a stamping operation. Each of the knee brackets 40 is generally D-shaped and includes a straight outer wall 42 located furthest away from the steering column 10 and a straight inner wall 41 located closest to the steering column 10 and spaced apart from the outer wall 42. The D-shaped knee brackets 40 each further include a cylindrical, convex rear wall 43 located forward of the driver's knees 12 and an opposite straight forward wall 44 seated adjacent the central bracket 28, as described further hereinafter. Advantageously, the knee brackets 40 lack any predetermined bend lines and are free to bend in any direction necessary for absorbing energy, except for where restricted by attachment to the central bracket 28, as described further hereinafter.

Figure 4:
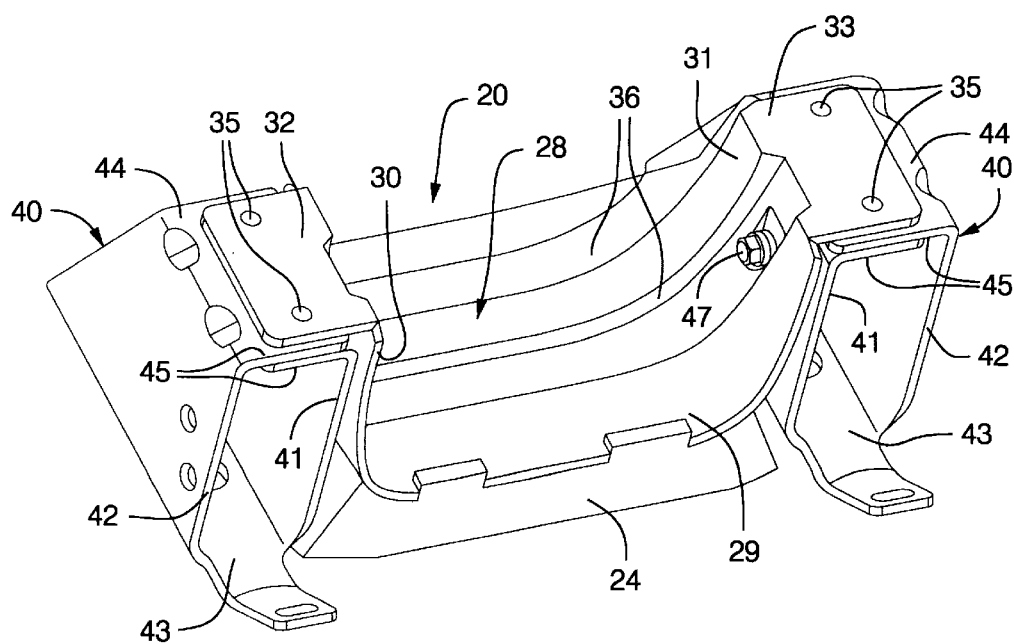
FIG. 4 shows a rear perspective view of the knee bolster assembly.
Figure 5:
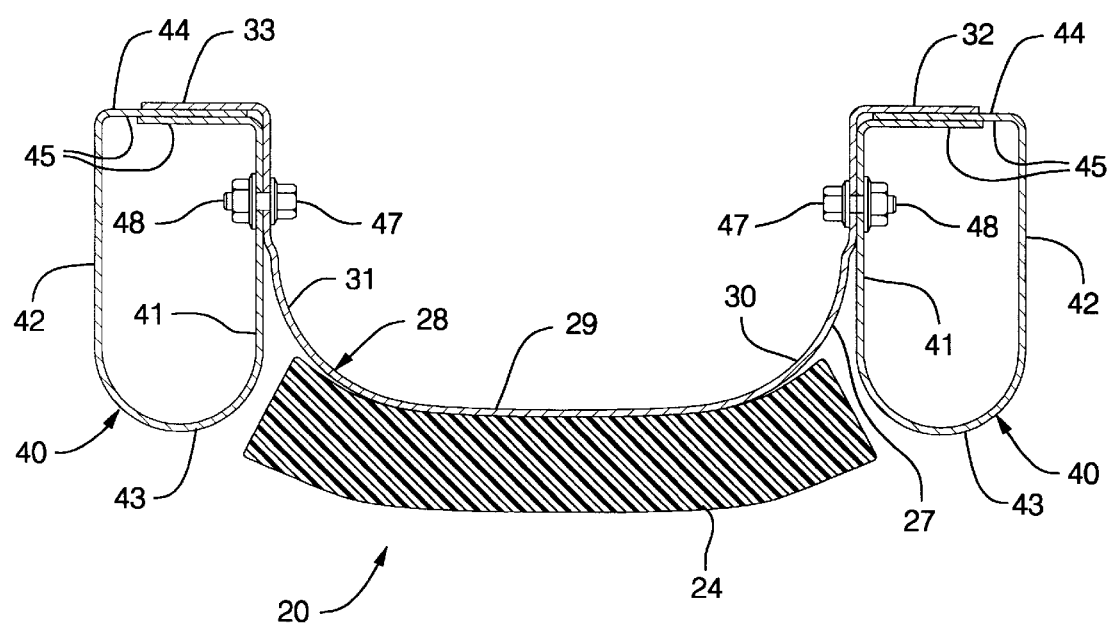
FIG. 5 shows a cross-sectional view of the knee bolster assembly taken along line 5—5 of FIG. 3.

The inner and outer walls 41, 42 each have a length which may be longer than the individual lengths of the rear and forward walls 43, 44. However, it will also be appreciated that the rear wall 43 may preferably be longer than the inner and outer walls 41, 42 when given a generous radius as shown in the schematic version in FIGS. 6 and 7. Thus, the knee brackets 40 are shaped like a somewhat elongated D and are each formed as an individual closed loop section. As best shown in FIGS. 4 and 5, the forward walls 44 include overlapping portions 45 which cooperatively form the forward walls 44 and provide a double layer of thickness on the forward walls 44.

The central bracket 28 preferably is cut and formed of an aluminum alloy similar to that of the knee brackets 40 and having a greater thickness, preferably being about 2 mm. Preferably, the central bracket 28 is significantly stiffer than the left and right knee brackets 40. In addition, the central bracket 28 has a generally convex rearward foam-receiving wall 29 such that during contact with the driver's knees 12, the knees 12 will be deflected off the central bracket 28 and towards the left and right knee brackets 40 for energy absorption, as described further hereinafter. It is also desirable to keep the central bracket 28 stiffer for less intrusion into the area of the steering column 10. The central bracket 28 is preferably generally C-shaped and includes a rearward foam-receiving wall 29 that is integrally connected to right and left side walls 30, 31. The central bracket 28 further includes right and left bent end walls 32, 33 which are bent laterally outward away from the right and left side walls 30, 31. The end walls 32, 33 serve as a base for attachment of the knee brackets 40 to the respective end walls 32, 33. The end walls 32, 33 and the knee brackets 40 each have aligned apertures 35, as best shown in FIG. 4, for attachment of the right and left knee brackets 40 to the steering column bracket 11 by suitable fasteners (not shown). The central bracket 28 may also include suitable rib portions 36 as best shown in FIGS. 3 and 4 for stiffening the central bracket 28 to decrease deformation of the central bracket 28 relative to the knee brackets 40.

Figure 1:
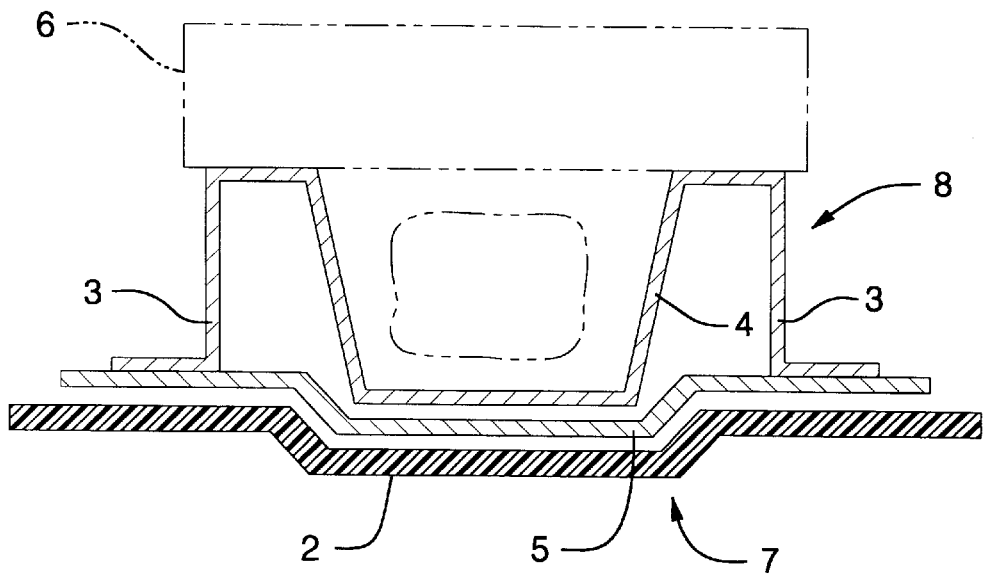
FIG. 1 shows a schematic cross-sectional view of a prior art knee bolster assembly in the undeformed condition.
Figure 2:
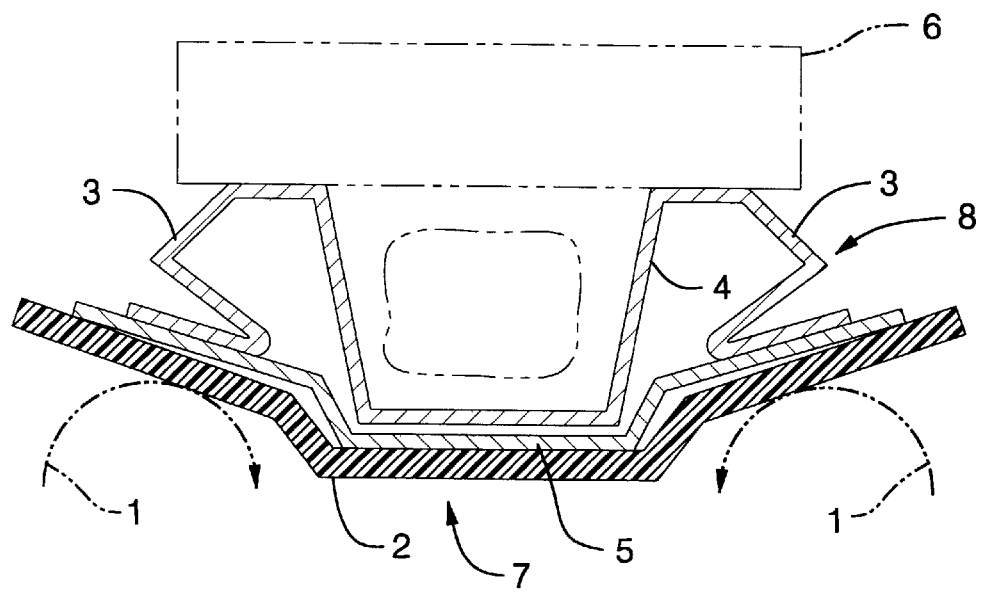
FIG. 2 shows the prior art assembly of FIG. 1, but in a deformed condition.
Figure 3:
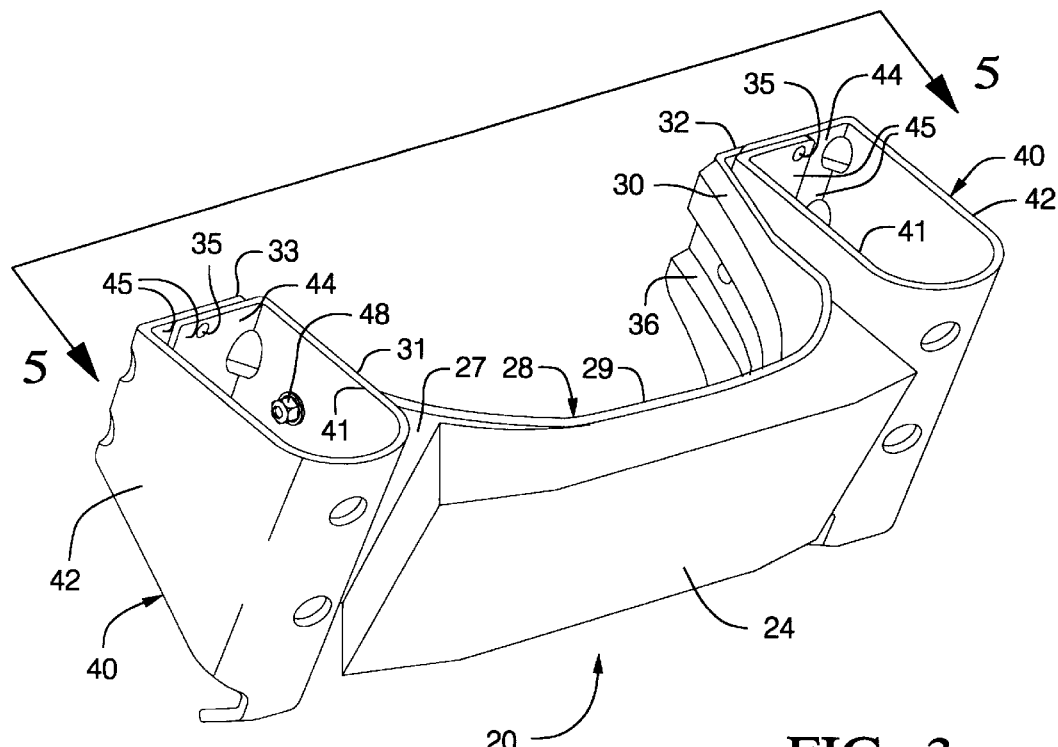
FIG. 3 shows a front perspective view of a knee bolster assembly according to the present invention.

As best seen in FIGS. 3 and 5, each of the knee brackets 40 also has the inner wall 41 securely attached to the respective side walls 30, 31 of the central bracket 28 by a suitable means, such as by a threaded bolt 47 and pierced nut 48. Advantageously, the attachment of the inner walls 41 of the separate knee brackets 40 to the central bracket 28 provides lateral stability to the knee brackets 40 for keeping the knee brackets 40 laterally in position during loading and for permitting absorption of a combination of lateral and frontal loads.

The foam element 24 is molded as a single integral unit preferably being polystyrene having a density of about two pounds per cubic foot. The foam element 24 is attached to a rear face 27 of the foam-receiving wall 29 of the central bracket 28 by any suitable means, such as hot melted glue. The foam element 24 and foam-receiving wall 29 of the central bracket 28 each preferably have a convex contour which is bent forward at the ends for directing the knees 12 laterally outboard towards the energy absorbing knee brackets 40. In addition, the foam element 40 provides protection when the knees 12 impact close to the center of the steering column 10.

During frontal loading from the knees 12 as best seen in FIG. 7, the knees 12 initially contact the trim panel 15 and may also contact the centrally located foam element 24. If this occurs, the foam element 24 provides protection to the knees 12. The foam-receiving wall 29 of the central bracket 28 is relatively stiff for deflecting the knees 12 laterally outboard and towards the knee brackets 40. The entire central bracket 28 is preferably relatively stiff and exhibits much lower deformation than the knee brackets 40.

During a collision, the knees 12 can load the knee brackets 40 in a combination of frontal and lateral directions. As the knee brackets 40 are loaded, the cylindrical rear walls 43 and the outer walls 42 begin deforming at relatively low loads and continuously deform about a multiple number of bend lines for a relatively steady compression loading due to the generally D-shape of the knee brackets 40 and the closed section of the knee brackets 40. Advantageously, the knee brackets 40 do not have any predetermined, specific bend lines or bend line initiators such that they are free to bend in any direction which is necessary for absorbing the loading of the knees 12.

Advantageously during deformation, the inner walls 41 and the forward walls 44 of the knee brackets 40 are securely connected to the stiffer central bracket 28 at the side walls 30, 31 and the bent end walls 32, 33, respectively. Thus, the outer walls 42 and rear walls 43 of the knee brackets 40 deform significantly more than the inner walls 41 and the forward walls 44 which remain relatively in position. The outer walls 42 move laterally outboard away from each other and guide the knee brackets 40 away from the steering column 10 for minimizing interaction with the steering column 10 during deformation. In addition, the rear and outer walls 43, 42 deform at relatively low loads and deform into a generally circular shape without any sharp bend lines and generally about a multiple number of nonspecific bend lines which are not predetermined or initiated. The attachment of the inner walls 41 to the side walls 31, 32 of the central bracket 28 provides lateral stability to the knee brackets 40 during deformation such that the knee brackets 40 can absorb a combination of frontal and lateral loading. Since the knee brackets 40 lack predetermined, specific bend lines, they are free to deflect and absorb energy in any direction, depending on the loading by the knees 12.

Thus, it will be appreciated that the knee brackets 40 deform about a multiple number of bend lines which are not predetermined for energy absorption during lateral loading as well as frontal loading directions as enabled by attachment of the inner walls 41 to the central bracket 28. Furthermore, the deformation of the knee brackets 40 about multiple nonspecific bend lines allows for an even loading and for relatively continuous energy absorption for a given deflection spread throughout the deformation event. It will further be appreciated that the knee bolster assembly 20 has a relatively light weight and simple construction due to the elimination of the outer knee bolster as enabled by the unique shape and attachment arrangement of the knee brackets 40, foam element 24, and central bracket 28.

It will be understood that a person skilled in the art may make modifications to the preferred embodiment shown herein within the scope and intent of the claims. For example, although the knee brackets 40 are preferably shown as formed separate and independent from the central bracket 28, it will be appreciated that the central bracket 28 and the knee brackets 40 could alternately be formed as a single integral unit having varied thickness.

While the present invention has been described as carried out in specific embodiments thereof, it is not intended to be limited thereby but is intended to cover the invention broadly within the scope and spirit of the appended claims.

What is claimed is:

1. A knee bolster assembly for use in a vehicle having a vehicle driver the vehicle including a steering column and a steering column bracket, the knee bolster assembly comprising:

a central bracket for partially surrounding the steering column;

a foam element mounted on the central bracket;

left and right knee brackets mounted on opposite sides of the central bracket, the knee brackets having a generally D-shaped cross-section including a convex rear wall positionable adjacent a vehicle driver such that upon loading by the vehicle driver, the knee brackets deform about multiple, nonspecific bend lines for absorption of energy; and wherein the central bracket includes a rearward foam-receiving wall and wherein the foam element is mounted on the foam-receiving wall and wherein the foam-receiving wall and foam element are shaped for directing frontal loads from the vehicle driver in laterally outboard directions towards the respective knee brackets.

2. A knee bolster assembly for use in a vehicle having a vehicle driver, the vehicle including a steering column and a steering column bracket the knee bolster assembly comprising:

a central bracket for partially surrounding the steering column;

a foam element mounted on the central bracket;

left and right knee brackets mounted on opposite sides of the central bracket, the knee brackets having a generally D-shaped cross-section including a convex rear wall positionable adjacent a vehicle driver such that upon loading by the vehicle driver, the knee brackets deform about multiple, nonspecific bend lines for absorption of energy; and wherein the D-shaped bracket has overlapping portions cooperatively forming forward walls and cooperatively closing the D-shaped cross section.

3. A knee bolster assembly for use in a vehicle having a vehicle driver, the vehicle including a steering column and a steering column bracket, the knee bolster assembly comprising:

a central bracket for partially surrounding the steering column;

a foam element mounted on the central bracket;

left and right knee brackets mounted on opposite sides of the central bracket, the knee brackets having a generally D-shaped cross-section including a convex rear wall positionable adjacent a vehicle driver such that upon loading by the vehicle driver, the knee brackets deform about multiple, nonspecific bend lines for absorption of energy; and wherein the central bracket includes a central foam-receiving wall and left and right side walls and wherein the foam element is connected to the foam-receiving wall and wherein the knee brackets are each attached to a respective one of the side walls, wherein the central bracket is significantly stiffer than the knee brackets and wherein the foam-receiving wall of the central bracket has a generally convex shape for directing forward loading from the driver in laterally outboard directions towards the knee brackets.

4. A knee bolster assembly for use in a vehicle having a vehicle driver, the vehicle including a steering column and a steering column bracket, the knee bolster assembly comprising:

a central bracket for partially surrounding the steering column;

a foam element mounted on the central bracket;

left and right knee brackets mounted on opposite sides of the central bracket, the knee brackets having a generally D-shaped cross-section including a convex rear wall positionable adjacent a vehicle driver such that upon loading by the vehicle driver, the knee brackets deform about multiple, nonspecific bend lines for absorption of energy; and wherein the knee brackets are formed separate and independent from the central bracket and wherein the knee brackets include a generally straight inner wall, a generally straight outer wall, and wherein the inner and outer walls are integrally connected by the respective rear walls, and wherein the knee brackets each include a generally straight forward wall, and wherein the inner walls and forward walls are securely connected to the central bracket for minimizing deformation during loading and wherein the rear walls and the outer walls steadily deform about multiple bend lines during loading for energy absorption and wherein the forward walls of the knee brackets are cooperatively formed by overlapping portions closing the cross-section.

5. A knee bolster assembly for use in a vehicle having a vehicle driver, the vehicle including a steering column and a steering column bracket, the knee bolster assembly comprising:

a central bracket for partially surrounding the steering column;

a foam element mounted on the central bracket;

left and right knee brackets mounted on opposite sides of the central bracket, the knee brackets having a generally D-shaped cross-section including a convex rear wall positionable adjacent a vehicle driver such that upon loading by the vehicle driver, the knee brackets deform about multiple, nonspecific bend lines for absorption of energy; and wherein the central bracket is significantly stiffer than the knee brackets.

6. A knee bolster assembly for use in a vehicle having a vehicle driver, the vehicle including a steering column and a steering column bracket, the knee bolster assembly comprising:

a central bracket for partially surrounding the steering column, the central bracket for attachment to the steering column bracket, the central bracket including a rear foam-receiving wall and left and right side walls extending forward from the foam-receiving wall, the central bracket including outward laterally bent ends extending from forward ends of the respective side walls;

a foam element mounted on the foam-receiving wall of the central bracket; and left and right knee brackets mounted to the central bracket, the knee brackets each having a generally D-shaped cross-section and including a convex rear wall positionable adjacent the vehicle driver, the knee brackets each including an inner wall attached to the respective side walls of the central bracket and each including a forward wall attached to the respective bent ends of the central bracket, the central bracket being significantly stiffer than the knee brackets such that upon loading by the vehicle driver, the knee brackets deform about multiple, nonspecific bend lines for absorption of energy and such that the outer walls and the rear walls of the knee brackets deform significantly more than the inner walls and the forward walls.

* * * * *